United States Patent [19]

Wu et al.

[11] Patent Number: 5,038,555
[45] Date of Patent: Aug. 13, 1991

[54] TWISTABLE CHEMICALLY TREATED GLASS FIBERS, FABRICS AND COATED ARTICLES

[75] Inventors: Shih-Jen Wu, Pittsburgh; Ernest L. Lawton, Allison Park, both of Pa.

[73] Assignee: PPG Industries, Inc., Pittsburgh, Pa.

[21] Appl. No.: 316,622

[22] Filed: Feb. 28, 1989

[51] Int. Cl.$^5$ .......................... D02G 3/18; D02G 3/40
[52] U.S. Cl. ........................................ 57/249; 57/250; 428/391
[58] Field of Search ................. 57/249, 250; 428/375, 428/378, 392, 391, 389, 383; 65/3.43, 3.44, 3.41; 523/209, 217

[56] References Cited

U.S. PATENT DOCUMENTS

| | | | |
|---|---|---|---|
| 2,324,483 | 7/1943 | Castan | 528/112 |
| 2,444,333 | 6/1948 | Castan | 528/95 |
| 2,494,295 | 1/1950 | Greenlee | 525/510 |
| 2,500,600 | 3/1950 | Bradley | 523/454 |
| 2,511,913 | 6/1950 | Greenlee | 525/511 |
| 3,227,192 | 1/1966 | Griffiths | 139/420 C |
| 3,265,516 | 8/1966 | Triplett et al. | 106/213 |
| 3,920,431 | 11/1975 | Reese | 65/3.1 |
| 4,049,597 | 9/1977 | Motsinger | 523/403 |
| 4,110,094 | 8/1978 | Motsinger | 65/3.41 |
| 4,259,190 | 3/1981 | Fahey | 252/8.6 |
| 4,374,177 | 2/1983 | Hsu et al. | 428/392 |
| 4,394,418 | 7/1983 | Temple | 428/391 |
| 4,410,082 | 10/1983 | McGinnis | 198/818 |
| 4,530,876 | 7/1985 | Brodmann et al. | 428/283 |
| 4,681,805 | 7/1987 | Puckett | 428/391 |

*Primary Examiner*—Joseph J. Hail, III
*Attorney, Agent, or Firm*—Kenneth J. Stachel

[57] ABSTRACT

Twisted bundle of glass fibers have on a substantial portion of the surface of each fiber a moisture reduced residue of an aqueous chemical treating composition (size). The size has an epoxy polymer as the major film forming polymer, at least one emulsifying agent for the epoxy polymer, at least one fiber lubricant in an effective fiber lubricating amount, at least one organofunctional metallic coupling agent in an effective coupling agent amount, polyvinylpyrrolidone, water dispersible or emulsifiable ultrahigh, high, or medium density polyethylene and water. The amount of the polyvinylpyrrolidone and polyethylene is in the range of around 1 to 15 weight percent of the nonaqueous components of the size for each of the polymers. When the bundle has less than around 400 filaments, starch is also present in an amount in the range of 0.5 to 15 weight percent of the nonaqueous components. The twisted bundle is produced by forming the fibers and chemically treating the fibers, gathering the fibers into a bundle, winding the fibers onto a package having a plurality of superimposed annular layers of bundles and conditioning the package to develop a moisture-reduced residue of the treatment, and unwinding the package in a horizontal position onto a vertical bobbin spinning about its longitudinal axis to produce a twist in the bundle. The twisted strand or yarn is suitable for coating with polymeric coatings like poly(vinyl chloride) plastisol coatings.

17 Claims, No Drawings

TWISTABLE CHEMICALLY TREATED GLASS FIBERS, FABRICS AND COATED ARTICLES

The present invention is directed to chemically treated glass fibers, where the chemical treatment allows strands of the fibers to be twisted and to be processed further with a reduced tendency for the fibers to have broken filaments and to result in improved alkaline resistance over standard starch-oil sized glass fibers.

Traditionally, twisted glass fiber strand and yarn are comprised of glass fibers treated with a thin surface treatment of a chemical composition containing a starch, oil and various emulsifiers. Various examples of such chemical treatments are found in U.S. Pat. Nos.: 3,227,192 (Griffiths); 3,265,516 (Triplett et al); 4,259,190 (Fahey); and 4,681,805 (Puckett). All of these patents disclose compositions for treating glass fibers having a type of size with starch and oil along with various emulsifiers. Glass fiber fabrics produced from twisted glass fiber strands or yarn, hereinafter referred to as 'strands' for both the singular and plural, have developed a wider marketability in recent years. Examples of this include the use of vinyl coated glass strands and fabrics for production of window screens and other screening materials and for reinforcement of cement and calcium silicate containing materials. Also, the weaving industry is demanding improved twisted glass fibers for use in various processes for development of more efficient and faster weaving processes.

It is an object of the present invention to provide twistable strands of a plurality of chemically treated glass fibers having a reduced tendency to have broken filaments both during the twisting operation and in subsequent processing and in the fabrics so produced.

SUMMARY OF THE INVENTION

The foregoing object and other objects gleaned from the following disclosure are accomplished by the twistable glass fiber strands of the present invention. The twistable glass fiber strand or strands are composed of a plurality of fibers having a dried residue of an aqueous chemical treating composition (size). This composition has two film forming polymers, one of which is a water emulsifiable or dispersible epoxy polymer, the other is polyvinylpyrrolidone. Additionally, the size has at least one emulsifier, at least one organometallic coupling agent, at least one fiber lubricant and polyethylene-containing polymer having at least a medium density and water as a carrier. The epoxy polymer is always in a major amount compared to the amount of polyvinylpyrrolidone. The amount of polyethylene-containing polymer is an effective amount for reducing strand tension during processing. The aqueous chemical treating composition is applied to the glass fibers during their formation, and the formed fibers are wound onto a spool to form a forming package of the glass fibers. A plurality of the forming packages are dried to remove moisture, and at least one strand of the forming package is twisted into the twisted glass fiber strand. When the strand or strands to be twisted have fewer filaments, the size also may have a minor amount of starch. Any of the twisted sized glass fiber strands of the present invention are weavable into fabric or are useful in producing nonwoven fabrics. Also, the twisted strands are suitable for application of a secondary coating of polymers of various types such as poly(vinyl chloride) plastisol.

DETAILED DESCRIPTION OF THE INVENTION

Any suitable water dispersible or emulsifiable curable epoxy polymer is usable in the treating composition for the glass fibers. These epoxy polymers include self-emulsifiable epoxies, or epoxy polymers dispersed or emulsified with one or more emulsifiers or surfactants. Suitable examples of these are disclosed in U.S. Pat. Nos. 4,110,094; 4,394,418 and 4,374,177, all of which are hereby incorporated by reference. Phenolic epoxy polymers are particularly well suited for use in the present invention. An example of which is the Epon 826 epoxy from Shell Chemical Company. Typically phenolic epoxies are obtained by the reaction of a stoichiometric excess of an epihalohydrin such as epichlorohydrin with a polyhydric phenol such as bis(4-hydroxyphenyl) 2,2 propane, bis(hydroxyphenyl)methane (obtained by the acid condensation of two moles of phenol with one mole of formaldehyde), hydroquinone, resorcinol or with a polyhydroxyalcohol such as polyethylene glycol, sorbitol, glycerol, etc. Such compounds are characterized by the presence of terminal epoxy groups. These compounds are further described in U.S. Pat. Nos. 2,324,483, 2,444,333; 2,494,295; 2,500,600 and 2,511,913, the disclosures of which are incorporated herein by reference. By varying the proportions of the epihalohydrin, the polyhydroxy compound and/or by varying the reaction conditions, compounds of low, intermediate or higher molecular weights may be produced which range from liquids to solids. Typically, the molecular weights range between 300 and 900, and more preferably, between 300 and 400. This epoxy resin is used in an amount from about 50 to 70 percent by weight and more preferably, between 60 and 61 weight percent based on the ingredients of the size other than water (nonaqueous components).

The lubricants which impart lubricity to the strand and/or which aid in further processing by increasing strand integrity, are typically of two classes: nonionic and cationic lubricants. Many of the former type are water insoluble while most of the latter type are water soluble.

The nonionic lubricant is typically a hydrogenated or saturated fatty acid ester of glycerol. Fatty acids by definition have 4 to 26 carbon atoms and in all cases an even number of carbon atoms per molecule. It is necessary that substantially saturated fatty triglycerides be used in the composition to reduce the oxidation of the sizing composition. The acid constituent of the saturated fatty acid esters usually have as a majority of their acid constituent, acids having from about 12 to 20 carbon atoms with only trace amounts of the lower and higher molecular weight acids being present. The use of these saturated fatty triglyceride lubricants has been limited and great difficulty is encountered in obtaining a stable homogeneous sizing composition. This is due to the high degree of hydrophobicity of the fatty acid lubricant The hydrogenated fatty acid ester lubricant is used in an amount from about 1 to 12 percent by weight and preferably around 3 percent by weight based on the ingredients of the sizing composition other than water. A nonexclusive example of a suitable nonionic lubricant is a polyalkylene glycol fatty acid like PEG-600 ML polyethylene glycol monolaurate available from Union Garbide Corp., Danbury, Conn.

The cationic lubricant is typically the amine salt of a fatty acid, such fatty acids being the same as those hereinbefore recited. However, it is preferable that the fatty acid moiety of the salt has between about 12 and 22 carbon atoms. The amines useful for forming the salt are tertiary amines of substantially low molecular weight, i.e., the alkyl groups attached to the nitrogen atom should have between 1 and 6 carbon atoms. This cationic lubricant aids in the processing of the glass fiber strand and the roving formed therefrom by imparting slip to the exterior of the strand or roving as it passes over various types of processing equipment. Also, the presence of tertiary amines with the lubricant can act as a curing agent for the epoxy polymer when the sized strands are heated, although a separate curing agent could be used with a nonionic or cationic lubricant. A suitable cationic lubricant is Emery 6717 material available from Emery Chemical Company, Cincinnati, Ohio, and is a partially amidated polyamine and a mixture of primary, secondary and/or tertiary amines and includes pelargonic acid amide of tetraethylene pentamine.

The cationic lubricant is used in an amount from about 0.5 to about 5 percent by weight based on the ingredients of the sizing composition other than water (nonaqueous solids).

In lieu of a single emulsifier an emulsifying system is useful in the sizing composition to obtain acceptable stability for the emulsion of the composition. This is a particular problem when the saturated fatty triglyceride lubricant is used in conjunction with the epoxy film former. This is due to the fact that the fatty acid ester lubricant and the epoxy resin are substantially diverse in chemical structure. Emulsifiers that emulsify the epoxy resin are diverse from those that emulsify the fatty acid ester lubricant In some cases destabilization occurs when the fatty acid ester lubricant is added to an emulsion containing the epoxy resin. It is advantageous at times to use a dual emulsifier system. One emulsifier is a polyoxyethylated castor oil like that available under the product designation "Emulphor EL-719". The other emulsifier is an alkylphenoxy polyalkylene alcohol like Igepal CA-630. The amounts of those emulsifiers in the size are effective to emulsify the epoxy polymer alone or in addition with nonionic lubricant. Preferably, the emulsifiers are in a 1:1 ratio to each other, but each is generally present in an amount in the range of around 5 to 7 weight percent of the nonaqueous components of the size. These ranges of emulsifiers are necessary in order to form a stable emulsion so that both the epoxy resin and, when present, a hydrogenated fatty acid ester lubricant can form a stable emulsion, along with the proper particle size for effective application to the glass fibers. This particle size is typically between 0.1 and 1.5 microns and more preferably about 0.3 micron. When the particle size is above 1.5 microns, inefficient application of the sizing composition to the glass fibers during forming is encountered and destabilization of the emulsion may start.

The organometallic coupling agent is useful in the glass fiber size in an amount from about 1 to about 20, preferably about 1 to about 15, percent by weight based on the nonaqueous components of the size. Examples of such coupling agents are the organofunctional trialkoxy silane coupling agents that have one portion of the molecule consisting of a highly hydrolyzable group such as

wherein R is an alkyl group having from 1 to 5 carbon atoms, preferably 1 to 2 carbon atoms. It is desirable for the other portion or organo portion of the molecule to have a group selected from acrylic, amino or epoxy groups. It has been found that silane coupling agents such as glycidoxyalkyl trialkoxysilanes, methacryloxyalkyl trialkyoxysilanes and mono- and polyamino alkyl trialkyoxysilanes are of particular utility in bonding the fibers to the resin matrix. More particularly gamma-aminopropyltrimethoxysilane, methacryloxypropyl-trimethoxysilane and glycidoxypropyltrimethoxysilan are useful for this purpose. When methacryloxypropyl-trimethoxysilane is used as a coupling agent, the methoxy groups must be hydrolyzed before it is incorporated into the sizing composition. This is accomplished by adding acetic acid to the coupling agent and stirring for a sufficient time and at a sufficient temperature to hydrolyze at least some of the

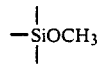

groups to form methanol and

Sufficient water is used in this hydrolysis to impart sufficient activity to the acetic acid.

A second film forming polymer of the aqueous treating composition is a polyvinyl pyrrolidone polymer. By the term "a polyvinyl pyrrolidone", hereinafter referred to as "PVP", it is meant any homopolymer obtained by the addition polymerization of a monomer which may be represented by the formula:

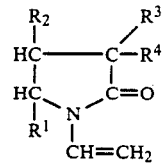

wherein $R^1$, $R^2$, $R^3$ and $R^4$ may each be hydrogen or lower alkyls. Examples of such monomers include N-vinyl-pyrrolidone, 5-methyl-N-vinyl-2-pyrrolidone, 4-methyl-N-vinyl-2-pyrrolidone, 5-ethyl-N-vinyl-2-pyrrolidone, 4-ethyl-N-vinyl-2-pyrrolidone, 3-methyl-N-vinyl-2-pyrrolidone, 3-ethyl-N-vinyl-2-pyrrolidone, 3,3-dimethyl-N-vinyl-2-pyrrolidone, 3,5-dimethyl-N-vinyl-2-pyrrolidone, and the like. These monomers and their homopolymerization products are known in the art. It is preferred that the PVP have an average molecular weight of from about 5,000 to 100,000. The amount of the aqueous soluble, dispersible or emulsifiable PVP present in the aqueous treating composition should not be too great to result in the dried size rubbing off the strand when the strand passes over contact points. Preferably the range is from about 1 to about 15 weight percent of the nonaqueous components of the size.

The aqueous dispersible, emulsifiable or solubilizable polyethylene-containing polymer with at least medium density useful in the aqueous sizing composition of the present invention is a polymer that contains predominantly polyethylene, but which may also contain a minor portion of 1-olefins or propylene or degradation derivatives thereof. The aqueous solubilizable, emulsifiable or dispersible polyethylene employed in the aqueous sizing composition can be a medium density, high density or ultra-high molecular weight polyethylene, or thermal or oxidative degradation derivatives thereof. The polyethylenes can be produced by any conventional processes, for example, the high pressure polymerization process, Ziegler process, Phillips process, Standard Oil Process and the like. To improve water dispersibility or emulsifiability thermal oxidation or carboxylate formation can be conducted by any method known to those skilled in the art. Oxidative degradation can be performed with any oxygen-containing gas like oxygen and/or ozone. Suitable examples of these polyethylenes are shown in U.S. Pat. No. 4,394,418 (Temple) hereby incorporated by reference.

A polyethylene emulsion which is suitable for use in the practice of the present invention is commercially available under the trade designation "Protolube HD" from National Starch and Chemical Co., Inc. This material is a nonionic polyethylene emulsion having a solids content of approximately 26%, a pH (1% solution) of approximately 8 and with approximately 75% water has an appearance of a milky emulsion and an odor of mild wax.

The amount of the aqueous dispersible, emulsifiable or solubilizable polyethylene-containing polymer used in the aqueous sizing composition is any strand tension reducing amount. The effective yarn tension reducing amount is that amount that reduced tension of the dried sized glass fiber strand or yarn to generally not greater than 30 grams and preferably in the range of 18 to 25 grams. This tension is measured when strand or yarn is removed from a package or collection of strand or yarn and conveyed to a processing operation. Generally, the amount of the polyethylene polymer ranges from around 1 to about 15 weight percent of the nonaqueous components of the size. Preferably the amount ranges from about 5 to about 10 weight percent. In many instances the polyethylene emulsion is present in a ratio of amounts with the PVP in the range of 0.5:1 to 2:1 in weight percent solids of the size. Surprisingly, it has been found that with the polyethylene in the size the yarn tension of removing yarn from a bobbin of yarn was nearly constant throughout the whole bobbin. In other words, the yarn tension, on removing the yarn from the bobbin, was the same for removal of yarn on the outside of the bobbin as it was for removal of yarn from the inside of the bobbin. In addition, it was found that the size has good compatibility with polyvinyl chloride secondary coatings placed on the sized glass fiber strand or yarn.

When the strand or yarn that is to be twisted is comprised of a smaller number of filaments of less than around 400 to 600, it is preferred to have in the size a minor amount of starch. Nonexclusive examples of strands having fewer filaments are the G150 strand, which has around 200 filaments, where each has a diameter of around 8.9 to 10.16 micrometers or microns and the DE-100 strands. Strands comprised of more filaments even up to as many as 1,000 such as a G-75 strand having 400 filaments with the same filament diameter and others like K-18, generally do not require the presence of the starch in the size. The minor amount of the starch that is present is an effective amount to reduce ringers in twisting of the glass fiber strands. The ringers are individual or groups of broken filaments in the forming package that separate from the main strand bundle undergoing twisting. These can result in broken filaments in the twisted yarn and/or break outs resulting in termination of twisting when the ringers are trapped in the bobbin yarn. Preferably, the amount of starch is to around 20 weight percent of the nonaqueous components in the size and most preferably from around 5 to around 15 weight percent. The types of starch that can be added are any of the starches used in the starch-oil sizes. Numerous examples of which are disclosed in U.S. Pat. Nos. 4,681,805 (Puckett); 4,259,190 (Fahey); 3,227,192 (Griffiths); and 3,265,516 (Triplett et al) all are incorporated herein by references as though specifically set forth herein. As an example, a suitable starch is National Starch 1554 that is a fractionated potato starch having around 28 percent amylose.

With the presence of starch in the size an additional ingredient can be included which is an antimicrobial or an antifungal agent such as organotin bactericides or methylenethiocyanate bactericides and the like known to those skilled in the art and added in conventional amounts.

Water is usually the carrier for the nonaqueous components in the size. The amount of water present in the size is that amount to facilitate the application of the aqueous size to the glass fibers preferably during their formation. To this end the total solids (non-aqueous) content of the aqueous size is generally in the range of around 0.5 to around 30 weight percent, and preferably around 3 to 10 weight percent. The total solids should be adjusted whereby the level of the size is acceptable for application to the glass fibers. For example, in a size which is predominantly water, the viscosity is between around 3 to around 60 centipoise at 20° C. Thickening agents can be used to increase the viscosity of the size, but generally if the viscosity is higher than 100 centipoise at 20° C the size is difficult to apply to the glass fibers during their formation.

Generally the preparation of the size occurs by the simultaneous or sequential addition of the components to form the aqueous size. The aqueous size is applied to the glass fibers preferably during their formation by any method known to those skilled in the art. The glass fiber can have any glass composition and be formed into fibers of any diameter known to those skilled in the art. For instance, suitable compositions include the "621-glass" and "E-glass" glass compositions and their lower or free boron and/or fluorine derivatives. The filament or fiber diameters generally range from around less than 3 to around 30 microns such as beta fibers to fibers with larger diameters that still allow for twisting of bundles of fibers. The glass fibers themselves can be formed by any method known to those skilled in the art by direct or indirect melt processes and forming the fibers through orifices in a bushing. Preferably water sprays are used to cool the fibers, and the fibers are treated with the aqueous size preferably, shortly after their attenuation from the bushing and their cooling by the water sprays. The fibers are drawn from the bushing by a winder, and after the size is applied, the fibers can be gathered into one or more strands and wound into an annular package on the winder. It is preferred when the strand construction has fewer filaments and when high fiber forming speeds are used that low air velocity applicators apply the size to the fibers. These applicators provide an environment near the applicator belt or roll surface with low velocity air movement Examples of such an applicator is disclosed in U.S. Pat. Nos. 4,491,082 (Barch et al) and 3,920,431 (Reese), both herein incorporated by reference as though specifically set forth herein.

The size is applied to the glass fibers in such a manner generally by any standard applicator except for the strands having fewer filaments. In the latter case reduced friction applicators are preferred. The application of the size to the fiber results in sized fibers having about 0.1 to about 2 weight percent of the size on a loss on ignition (LOI) basis. Preferably, the LOI for the size is less than around 1.5 weight percent. The LOI test is a well-known technique for determining the amount of size on glass fibers. It involves weighing the coated or sized glass fiber strand and burning the size off of the glass fiber strand to determine the weight of the strand without the size. The sized glass fiber strands are collected into multilayered packages and dried to reduce the moisture content of the package to generally in the range of about 1 to 15 weight percent of the package. Accomplishing the moisture reduction usually involves drying the packages in an oven at conventional temperatures and times or by air drying for conventional time periods.

The twistable sized strand of glass fibers of the present invention can be twisted by any glass fiber twisting technique known to those skilled in the art. For instance, any twist frames for twisting glass fibers known to those skilled in the art are useful in twisting the glass fibers of the present invention. Generally twisting is carried out by feeding the strand or yarns at a controlled rate to a bobbin placed on a spindle rotating at a speed which would enable the yarn or strand to be wound onto the bobbin at a faster rate than the rate at which the strand or yarn is supplied. Generally, the strand is fed through a travelling eye located on a ring to control the placement of the fiber on the bobbin and the packing of the fiber layers on the bobbin. The ring moves up and down the actual length of the bobbin from its mounting on the twist frame. Generally the level of twist is in the range of around 0.5 to around 3 turns/inch. Twisting places a demand on the twistable strand in that the strand must be flexible enough to undergo the rigors of twisting and allow for the individual filaments being free to move in the bundle or strand. The twisted strand or yarn present on the bobbin is useful in producing woven and nonwoven fabrics, knitted and/or braided products and reinforcement for various tape products and composite products. Woven fabric can be produced with any conventional shuttle loom, air jet loom, rapier loom, or shuttleless weaving machine known to those skilled in the art. In producing the woven fabric the warp yarns can be slashed with any conventional size or one such as that disclosed in U.S. Pat. No. 4,530,876 hereby incorporated by reference as though specifically set forth herein. In addition the twisted sized glass fiber strands are useful in producing screening fabric through the application of a polyvinylchloride (PVC) plastisol coating to the twisted strands or yarn. The plastisol coated strand is woven into various types of fabrics. Also, the woven fabrics of strand may be coated with a plastisol coating for various end use applications. For instance, the PVC coated sized glass fiber strand, yarn or fabric can be used in reinforcing cement and other calcium silicate materials.

PREFERRED EMBODIMENT

Table A shows two formulations of the preferred embodiment where the formulation "A" is useful with strands and yarn having a higher number of filaments, preferably around 400 or more, and formulation "B" is useful with strands or yarn having fewer filaments, preferably around less than 400.

TABLE A

| | Preferred Embodiments | |
|---|---|---|
| Components | Formulation A (grams) | Formulation B (grams) |
| Epoxy polymer (EPON 826 epoxy) | 750.4 | 690.0 |
| Polyoxyethylated castor oil emulsifier (Emulphor EL-719) | 76.3 | 70.4 |
| Alkylphenoxypolyalkylene alcohol emulsifier (Igepal CA-630) | 76.3 | 70.4 |
| Water for epoxy | 902.6 | 851.0 |
| PVP-K-30 | 61.5 | 61.5 |
| Water | 615.0 | 615.0 |
| Polyethylene glycol (PEG 600 ML) | 36.9 | — |
| Water for PEG | 230.0 | — |
| Water | 2040.0 | 1671.0 |
| Acetic acid | 7.4 | 6.8 |
| Glycidoxypropyltrimethoxysilane Z-6040 | 148.8 | 137.3 |
| Cationic lubricant (Emery 6717) | 18.5 | 16.5 |
| Polyethylene-containing polymer emulsion (Protolube HD) | 219.7 | 246.0 |
| Starch (National 1554) | — | 123.0 |
| Water for starch | — | 2782.0 |
| Water (for 5 gallon mix) | Balance | Balance |

Formulation A is prepared by placing 1,361 units of hot water (140°–160° F.) into a premix tank for the PVP which is added with vigorous agitating so as to minimize lumping of the PVP. After the PVP is dispersed, the diluted material is metered into a premix tank along with any of the remaining water which was not initially added, and the mixture is agitated for 15 minutes or until the solution is complete The epoxy polymer and the two emulsifiers are added to a Eppenbach tank and the Eppenbach mixer is started and steam is added to jacket and heat the Eppenbach to 100°±5° F. Steam is cut off so as not to overheat. The emulsion ingredients should be mixed thoroughly before the addition of the 902.6 grams of deionized water. All of the water used in the preparation is deionized water. The hot water is added at a rate of around 1 to 1.5 gallons/minute and the Eppenbach baffle plate is adjusted to insure best inversion. The mixture thickens, turns white and inverts and after inversion the rate of addition of hot water is increased to double the volume of the emulsion. The epoxy emulsion is added to the main mix tank. To this mixture in the main mix tank the diluted PVP is added. The 230 grams of hot water and the nonionic lubricant PEG 600 are added to a premix vessel with agitation which is continued for 5 additional minutes or until a complete solution is achieved which is indicated by obtaining a clear solution. This dilution is added to the main mix tank. Again, water (2,040 grams) at a temperature of 79° F. is added to a premix tank to which the acidic acid is added. A lightning mixer is started and the coupling agents are added to the premix tank with agitation for 30 seconds to 2 minutes. The solution will become clear, and it is pumped to the main mix tank. An amount of 227 grams of hot water is added to a premix tank, and the cationic lubricant is added along with additional hot water, and the solution is agitated for around 15 minutes or until the solution is complete and has a tan color. The solution is then added to the main mix tank. The polyethylene-containing polymer is added to the main mix tank, and the materials in the main mix tank are diluted with water to the final volume and agitated at least 5 minutes.

Formulation B is prepared in a similar manner to formulation A for like components including the epoxy dispersion, the dilution of the PVP, the hydrolysis of the epoxy silane coupling agent, the dilution of the cationic lubricant and the dilution of the polyethylene-containing polymer. In the preparation of the epoxy emulsion 851 grams of hot water are added at a rate of around 1 gallon per minute to prepare the emulsion. For the coupling agent, the water for hydrolysis is around 1671 grams. In addition, the starch in formula B is prepared by adding around 2782 grams of the water at a temperature of 60-80° F. where the water is deionized, and it is added to a slurry tank. The agitator is started and the starch is added to the slurry tank. Once all of the starch lumps disappear, the starch can be cooked with continued agitation during cooking. The jet cooker cooks the starch at a temperature of around 255° F.±5°, and at the end of starch cooking, a minimal amount of water is used to flush the starch cooker. The cooked starch is added to the main mix tank as the first component in the main mix tank and sequentially thereafter, there is added the emulsified epoxy, diluted PVP, hydrolyzed epoxy silane coupling agent, diluted cationic lubricant and diluted polyethylene-containing polymer. The mixture is diluted with deionized water at a temperature of 60-80° F. to the desired volume. Subsequently, the antimicrobial agent Chemtreat CL2141 is added in an amount of 4 grams to the main mix tank, and the size is stirred for 10 minutes.

Formulation A is preferred for application to glass fibers that have a number of filaments of around 400 or more. Formulation B is preferred to application to fibers that are formed into strands comprised of a few filaments on the order of less than 400 filaments per strand. Also, both filaments preferably are applied to glass fibers having fiber diameters in the range of around 8.9 microns to 10.2 microns.

The size composition is applied to the fibers prior to the time they are gathered to form the strand. The application is by means of a roller applicator or sleeve applicator which is partially submerged in size contained in a reservoir that is adapted to provide low velocity air flows near the applicator surface. The fibers are gathered into strands by a gathering shoe and wound onto a forming package rotating approximately around 4,420 rpm to produce a strand travel speed of approximately 14,000 feet per minute. Other methods of applying the size to the fibers such as pad applicators and the like may be employed, and also a strand may be formed by means other than winding on a forming tube such as by a pair of rotating puller wheels which direct the fibers into a suitable collecting device. The percent size on the glass fiber strand, referred to as percent LOI (loss on ignition), of the air-dried, twisted sized strand is around 1.2.

The glass fiber strands wound onto the forming package are unwound onto a bobbin by mounting the forming package on a twist frame and removing the strand from the forming package and placing it on the bobbin. During the unwinding and rewinding step a twist is imparted to the strand which provides integrity for subsequent processing. Preferably the strand is twisted as a single strand on a twist frame such as those available from Saco-Lowell that applies a twist level of around 1.3 in the Z or S directions. The spindle speed is around 5,300 to 5,800 rpm, and the humidity is around 40 to 50 percent and the temperature is around 75 to 80° F.

The twisted strand or strands can be woven into fabric or cloth by any method known to those skilled in the art. It is also possible to prepare nonwoven fabrics from the twisted sized strands of the present invention. Also, the strand prior to twisting or after twisting can be further processed as reinforcement for adhesive tape and packaging tape. Also, a poly(vinylchloride) plastisol coating as well as other polymeric coatings can be applied to the woven and nonwoven fabrics and cloth of the twisted sized strand, as well as the strand or yarn itself, of the present invention. These polymer coated products are useful for the preparation of screen yarn and fabrics for reinforcement of silicate materials such as cement. To produce strand or yarn or a fabric coated with polyvinylchloride plastisol or other polymeric coating, the glass strands or yarn should have adequate integrity, lubricity and compatibility with the PVC plastisol or coating polymer to facilitate the coating operation. The improved strand or yarn for this operation are those having reduced fuzzball accumulation on the die applying the PVC plastisol to the strand or yarn and/or lower broken filament counts or levels during the coating process.

EXAMPLES

Several twisted, sized glass fiber strands were prepared in accordance with the preferred embodiment using formulations A and B and formulation 1 and 2 of Table 1. The latter formulations were prepared and applied to glass fibers in a similar method to that of Formula A of Table A. Twisting was performed as mentioned for the preferred embodiment.

TABLE 1

| Components | Formulation 1 (grams) | Formulation 2 (grams) |
|---|---|---|
| Epoxy polymer (EPON 826 epoxy) | 662.1 | 721.3 |
| Polyoxyethylated castor oil emulsifier (Emulphor EL-719) | 67.5 | 77.9 |
| Alkylphenoxypolyalkylene alcohol emulsifier (Igepal CA-630) | 67.5 | 77.9 |
| Water | 230 | 230 |
| PVP-K-30 | 131.8 | 152 |
| Water | 1361 | 1361 |
| Polyethylene glycol (PEG 600 ML) | 32.1 | 37.1 |
| Pureco Oil K-22 hydrocarbon oil | — | 42.6 |
| Water | 2040 | 2040 |
| Acetic Acid | 6.6 | 7.6 |
| Glycidoxypropyltrimethoxysilane Z-6040 | 131.8 | 152 |
| Water | 227 | 227 |
| Cationic lubricant Emery 6717 | 14.9 | 17.2 |
| Polyethylene-containing polymer emulsion (Protolube HD) | 492 | 567.7 |
| Starch (National 1554) | None | None |
| Water (for 5 gallon mix) | Balance | Balance |
| Solids | 6.5 | 7.5 |

Table 2 presents the conditioning time for the bobbins, and the twisting breaks in percentage of packages twisted for a first and second doff (D') and broken filaments per 1,000 yards for a first and second doff (D').

Example (III. Ex.), as disclosed in U.S. Pat. 4,259,190 (Fahey). The results are given in Table 3.

TABLE 3

| Formulation of Tables 1 or A | 1 | 1 | 2 | B | B | B | III. Ex. |
|---|---|---|---|---|---|---|---|
| No. Bobbins | 10 | 7 | 10 | — | — | — | — |
| (Total lbs.) | (95.1) | (55.1) | (95.1) | (98.2) | (83.2) | (95.8) | (98.6) |
| Bobbin Hardness | — | — | — | 74.5 | 67.0 | 63.6 | 67.0 |
| Broken Filament | 0.9 | 1.7 | 1.0 | 0.9 | 0.5 | 0.4 | 2.3 |
| Plant Outside | | | | | | | |
| ⅓ 2-Hr. Run | 0.0 | 0.0 | 0.4 | 0.2 | 0.3 | 0.3 | 0.7 |
| ⅔ 4-Hr. Run | 0.4 | 0.4 | 0.2 | 0.3 | 0.4 | 0.5 | 0.7 |
| Inside | 0.1 | 0.3 | 0.3 | 0.3 | 0.4 | 0.4 | 0.8 |
| Number of Die Breaks | 0 | 0 | 0 | 0 | 0 | 0 | 2 |
| Die Breaks/Lbs. | 0.00 | 0.00 | 0.00 | 0.00 | 0.00 | 0.00 | 0.02 |
| Shedding | | | | | | | |
| Broken Filament (Die) | Light | Light | Light | None | None | None | Heavy |
| Broken Filament (Creel) | Light | Light | None | Light | Light | Light | Medium |
| Binder Shedding Guide Eyes & Tension Post | — | — | — | None | None | None | Medium |
| Yarn Tension at | | | | | | | |
| Start-Up | 25–39 | 21–28 | 20–30 | — | — | — | — |
| 1 Hr. Run | 19–24 | 20–23 | 18–21 | — | — | — | — |
| 2 Hr. Run | 16–20 | 16–20 | 18–20 | — | — | — | — |
| 4 Hr. Run | 19–20 | 18–20 | 18–21 | — | — | — | — |
| Inside | 18–24 | 20–22 | 18–21 | — | — | — | — |

The doff indicates two twisted strand bobbin packages prepared from a single feed or forming package. The strand construction was a G-150 strand where the filaments had a diameter in the range of 9.53 ±0.63 microns. The G-150 sized strand were twisted at spindle speed of 5,560 rpm and at a twist level was 1.3 in the Z direction. The condition time is the time in hours that the forming packages of sized strand were stored before twisting at a temperature of 78° F. and a relative humidity of 45 percent. The twisting breaks in percent was determined by the number of bobbins that brake out divided by the total number of bobbins tested for the sample and multiplying by 100. The broken filaments per 1000 yards was determined by the device taught in U.S. Pat. No. 4,610,707 (Grundy) referred to as "BF-Tester".

TABLE 2

Twisting Performance of G-150 Strand With Sized Fibers

| Twisted Strand of Size Formulation of Table 1 | Conditioning (Hours) | Twisting Breaks (%) | | Broken Filaments Per 1000 Yards | |
|---|---|---|---|---|---|
| | | 1st D' | 2nd D' | 1st D' | 2nd D' |
| Formulation B | 8 | 0.0 | 4.7 | 0.36 | 0.65 |
| | 8 | 0.0 | 0.0 | | |
| | 48 | 4.8 | 4.8 | | |
| | 144 | 4.8 | 4.8 | | |
| | 8 | 0.0 | 4.8 | 1.15 | 0.78 |
| | 48 | 4.8 | 4.8 | | |
| | 8 | 3.75[2] | 13.75[2] | | |

[2] = Average of a number of samples.

Several samples of twisted sized glass fiber strands (G150) prepared in accordance with the preferred embodiment were coated with a polyvinylchloride plastisol coating in accordance with standard industry techniques. The yarn used in the coating operation was tested for bobbin hardness, broken filaments per plain (average), shedding of material from the filament or binder or from the dies or from the creels and for number of die breaks and die breaks per pound. The same was performed for starch-oil sized fibers, Illustrative In Table 3 the bobbin hardness was measured by a Shore T hardness gauge. The broken filaments/plane were measured at the outside of the bobbin, at the bobbin yarn layer after one-third and two-thirds of the yarn has been removed and at an inside layer of yarn in the bobbin. This is a visual inspection test and the number reported is the average of a number of bobbins run in the coating operation. The number of die breaks reports the number of times during a trial that there is a break out of the yarn going through the plastisol coating die. The number of die breaks/pound is the number of die breaks previously reported divided by the total number of pounds of that sample processed through the coater. Shedding is measured for samples 1 and 2 from the filament or from the binder. For samples B and that of the Illustrative Example shedding is measured at the die of the coater or at the creel where yarn is removed from packages for feeding to the coater.

The yarn tension was measured on yarn removed from the bobbin in a creel after the yarn passed the guide eyes and tension post of the creel. The measuring device was a needle-type tensiometer.

The data in Table 4 summarize testing conditions and the percent retention of tensile strength after the samples were treated with alkali. This alkaline resistance test was performed by immersing the polyvinyl chloride coated yarn into a simulated cement solution containing sodium hydroxide, potassium hydroxide and calcium hydroxide. The polyvinyl chloride coated yarn samples were prepared by two different commercial types of coating processes for sections A and B of Table 4. The twisted size glass fiber yarn of each section were coated in the same manner with the indicated type of PVC coating. The type A PVC plastisol coating was either a black or gray version of one type of commercial PVC plastisol coating. The type B PVC was another type of commercial plastisol coating. These different PVC coatings and processes were used in the G-150 twisted glass fiber yarn with the indicated size of Table 4. In the direct comparison in sections A and B of Table 4, the improved strength of the twisted strand of the present invention versus the twisted strand of the Illustrative Example is seen for every time of alkaline testing. The test for alkaline resistance is generally described in an article entitled "Rubber Coatings For Fiber Glass Protection In Alkaline Environment", P. Dreyfuss, R.D. Vargo, R.S. Miller and R. Bright, Polymeric Materials, Science and Engineering, Volume 53, pages 870–873, 1985, American Chemical Society, Fall Meeting 1985, Chicago, Ill., which is hereby incorporated by reference as though specifically set forth herein.

TABLE 4 (A)

Alkaline Resistance Testing

| Alkaline Testing Conditions | | % Tensile Retained for Sample of G-150 Material and Form | | |
|---|---|---|---|---|
| | | Ill. Ex. With | Size A With Type A PVC | |
| Temperature | Time | Type A PVC | Black | Gray |
| Room Temperature, | 7 days | 87.6 | 103.9 | — |
| | 7 days | 86.1 | 99.3 | — |
| | 8 days | 82.7 | 98.6 | 98.6 |
| 55° C. | 1 day | 88.1 | 103.8 | — |
| | 3 days | 92.1 | 98.9 | — |
| | 6 days | 80.7 | 95.6 | — |
| | 7 days | 87.5 | 105.2 | — |
| | 8 days | 82.7 | 100.2 | 89.9 |
| 70–75° C. | 3 days | 78.2 | 92.9 | — |
| | 7 days | 49.6 | 84.0 | — |
| 80–85° C. | 1 day | 85.7 | 97.6 | — |
| | 2 days | 75.2 | 81.1 | — |
| | 4 days | 59.7 | 90.6 | — |
| | 6 days | 56.6 | 86.2 | — |

TABLE 4 (B)

Alkaline Resistance Testing

| Sample of G-150 Material & Form | Alkaline Testing Conditions Temperature Time | % Tensile Retained |
|---|---|---|
| Ill. Ex. Coated with Type B PVC | Room Temperature, 8 days | 95.5 |
| | 55° C. 8 days | 86.3 |
| Size B of Table A (Coated with Type B PVC) | Room Temperature, 8 days | 101.3 |
| | 55° C. 8 days | 96.5 |
| Single-end Yarn with Size B of Table A (Coated with Type B PVC) | Room Temperature, 8 days | 100.3 |
| | 55° C. 8 days | 100.9 |

From the tables the improvements are evident in alkaline resistance, twisting and performance in PVC coating with the twistable glass fibers of the present invention. The improvement in alkaline stability is shown from improved percent tensile strength retained The improvement in twisting is shown from fewer broken filaments of the strands of the sized fibers in twisting the strands, especially for strands of fewer filaments receiving a high level of twist of around 1.3. The improvement in PVC coating performance is shown by fewer broken filaments in processing including in pay out from packages and in breakage in the PVC coating die. This is accomplished while achieving good yarn tension in removal from creel for processing. The high level of twist for the lower number of fibers making up the strand is indicated by the 1.3 turns per inch of the strand as the twist level. Also, this twist level can be achieved at good twist processing times.

We claim:

1. Twisted bundle of a plurality of glass fibers, where the fibers have a moisture-reduced residue of a chemical treatment on a substantial portion of their surface, where the chemical treatment comprises:
   a. water emulsifiable or dispersible, curable epoxy polymer as the major film forming polymer,
   b. an emulsifying agent for the epoxy polymer selected from the group consisting of polyoxyalkylated castor oil, alkylphenoxy polyalkylene alcohol, and mixtures thereof, where with mixtures each emulsifier is present in an amount of around 1 to 7 weight percent of the nonaqueous components,
   c. at least one fiber lubricant in an effective fiber lubricating amount,
   d. at least one organofunctional metallic coupling agent in an effective coupling agent amount,
   e. polyvinyulpyrrolidone film forming polymer as a minor film forming polymer,
   f. polyethylene-containing polymer in an effective amount to reduce strand tension,
   g. water in an amount to give a total solids content in the range of around 0.5 to 30 weight percent.

2. Twisted bundle of claim 1, wherein there are present two fiber lubricants, one of which is a nonionic lubricant, and the other is a cationic lubricant.

3. Twisted bundle of claim 2, wherein the nonionic lubricant is a polyalkylene glycol fatty acid including polyethylene glycol monolaurate, and the cationic lubricant is an amine salt of a fatty acid where the amine salts include tertiary amines including a cationic lubricant that is a partially amidated polyamine and a mixture of primary, secondary and/or tertiary amines including pelargonic acid amide of tetraethylene pentamine.

4. Twisted bundle of claim 3, wherein the nonionic lubricant is present in an amount in the range of around 0.5 to 12 weight percent of the nonaqueous components of the chemical treatment and the cationic lubricant is present in an mount in the range of around 0.5 to 5 weight percent of the nonaqueous components.

5. Twisted bundle of claim 1, wherein the organofunctional metallic coupling agent is selected from the group consisting of glycidoxyalkyl trialkoxysilanes, methacryloxyalkyltrialkoxysilanes, aminoalkyltrialkoxysilanes, and polyaminoalkyltrialkoxysilanes present in an amount in the range of around 0.5 to 15 weight percent of the nonaqueous components.

6. Twisted bundle of claim 1, wherein the polyethylene-containing polymer is selected from the group consisting of high density polyethylene water emulsifiable or dispersible polyethylene, medium density water emulsifiable or dispersible polyethylene, ultra high molecular weight water dispersible or emulsifiable polyethylene in an amount in the range of around 1 to 15 weight percent of nonaqueous components of the chemical treatment.

7. Twisted bundle of claim 1, wherein the chemical treatment includes starch in an effective ringer-reduction amount.

8. Twisted bundle of claim 7, wherein the fiber lubricant is a cationic lubricant selected from the group consisting of amine salts of fatty acids where the fatty acid moiety has from between about 12 to 22 carbon atoms, and the amines of the salt are selected from primary, secondary and/or tertiary amines and including pelargonic acid amide of tetraethylene pentamine in an amount in the range of around 0.5 to 3 weight percent of the nonaqueous components.

9. Twisted bundle of claim 1, which includes a second coating of poly(vinyl chloride) plastisol on the twisted bundle.

10. Twisted bundle of a plurality of glass fibers of less than 400 fibers where the fibers have a moisture-reduced residue of a chemical treatment on a substantial portion of their surface, where the chemical treatment comprises:
   a. water emulsifiable or dispersible, curable epoxy polymer as the major film forming polymer,
   b. at least one emulsifying agent selected from the group consisting of polyoxyalkylated castor oil, alkyl phenoxy polyalkylene alcohol and mixtures thereof in an amount of around 1 to 7 weight percent of the nonaqueous components,
   c. at least one cationic lubricant selected from amine salts of fatty acids having an even number of carbon atoms from 4 to 26 and including partially amidated polyamine with a mixture of primary, secondary and/or tertiary amine salts including pelargonic acid amide of tetraethylene pentamine present in an amount in the range of around 0.5 to 3 weight percent of the nonaqueous components,
   d. at least one organofunctional trialkoxysilane coupling agent in an effective coupling agent amount,
   e. polyvinylpyrrolidone in an amount in the range of around 1 to 15 weight percent of the nonaqueous components of the size,
   f. water soluble, dispersible or emulsifiable medium or high density polyethylene-containing polymer in an amount in the range of 1 to 15 weight percent of the nonaqueous components,
   g. at least one starch present in an amount in the range from 0.5 to 15 weight percent of the nonaqueous component,
   h. water in an effective amount to give a total solids for the chemical treating composition in the range of 1 to 30 weight percent.

11. Twisted bundle of claim 10, wherein the organofunctional trialkoxysilane coupling agent is selected from the group consisting of glycidoxyalkyl trialkoxysilanes, methacryloxyalkytrialkoxysilanes, aminoalkyltrialkoxysilanes, and polyaminoalkyltrialkoxysilanes present in an amount in the range of around 0.5 to 5 weight percent of the nonaqueous components.

12. Twisted bundle of claim 10, which includes a nonionic lubricant in an amount of 0.5 to about 10 weight percent of the nonaqueous components of the size.

13. Twisted bundle of claim 10, which includes the bundles being in the twisted form and having a second coating of poly(vinylchloride) plastisol.

14. Twisted bundle of a plurality of glass fibers having greater than 400 fibers in the bundle, where the fibers have a moisture-reduced residue of a chemical treatment on a substantial portion of their surface, where the chemical treatment comprises:
   a. water emulsifiable or dispersible, curable expoxy polymer as the major film forming polymer,
   b. at least one emulsifying agent for the epoxy polymer,
   c. a nonionic fiber lubricant that is a polyalkylene glycol fatty acid including polyethylene glycol monolaurate in an amount in the range of 0.5 to 10 weight percent of the nonaqueous components of the chemical treatment,
   d. a cationic lubricant present is an amine salt of a fatty acid where the amine salts include tertiary amines including a cationic lubricant that is a partially amidated polyamine and a mixture of primary, secondary and/or tertiary amines including pelargonic acid amide of tetraethylene pentamine in an amount in the range of 0.5 to 5 weight percent,
   e. at least one organofunctional trialkoxysilane coupling agent in an effective coupling agent amount,
   f. polyvinylpyrrolidone polymer present in an amount in the range of 1 to 15 weight percent of the nonaqueous components,
   g. water emulsifiable or dispersible high or medium density polyethylene in an amount in the range of 1 to 15 weight percent of the nonaqueous components, and
   h. water in an effective amount to give a total solids for the chemical treatment in the range of 1 to 30 weight percent.

15. Twisted bundle of claim 14, wherein the emulsifier for the epoxy resin is selected from the group consisting of polyoxyalkylated castor oil, alkylphenoxy polyalkylene alcohol, and mixtures thereof, where with mixtures each emulsifier is present in an amount of around 5 to 7 weight percent of the nonaqueous components.

16. Twisted bundle of claim 14, wherein the organofunctional trialkoxysilane coupling agent is selected from the group consisting of glycidoxyalkyl trialkoxysilanes, methacryloxyalkyltrialkoxysilanes, aminoalkyltrialkoxysilanes, and polyaminoalkyltrialkoxysilanes present in an amount in the range of around 0.5 to 5 weight percent of the nonaqueous components.

17. Twisted bundle of claim 14, which includes the bundles being in a twisted form and having a second coating of poly(vinyl chloride) plastisol.

* * * * *